United States Patent
Singhal et al.

(10) Patent No.: US 9,398,092 B1
(45) Date of Patent: Jul. 19, 2016

(54) FEDERATED RESTORE OF CLUSTER SHARED VOLUMES

(71) Applicant: EMC Corporation, Hopkinton, MA (US)

(72) Inventors: Upanshu Singhal, Bangalore (IN); Sunil Kumar Yadav, Bangalore (IN); Soumen Acharya, Bangalore (IN); Poornima Ramu, Bangalore (IN); Vedavathi Ht, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 217 days.

(21) Appl. No.: 13/626,743

(22) Filed: Sep. 25, 2012

(51) Int. Cl.
G06F 15/173 (2006.01)
H04L 29/08 (2006.01)
H04L 12/24 (2006.01)

(52) U.S. Cl.
CPC ........ H04L 67/1097 (2013.01); H04L 41/0859 (2013.01)

(58) Field of Classification Search
USPC ......... 709/201, 202, 203, 204, 206, 208, 223, 709/224, 225, 226, 246, 248; 711/161, 162; 707/999.102, 999.2, 999.202, 609, 707/790, 809, 812, 999.203, 999.1; 715/229; 714/15, 16, 6.12, 6.13; 712/31, 32
See application file for complete search history.

(56) References Cited

U.S. PATENT DOCUMENTS

| | | | |
|---|---|---|---|
| 6,728,751 B1 * | 4/2004 | Cato et al. | 709/202 |
| 8,549,123 B1 * | 10/2013 | Wilkinson et al. | 709/223 |
| 8,631,411 B1 * | 1/2014 | Ghose | 718/102 |
| 8,676,946 B1 * | 3/2014 | Deadwiler et al. | 709/223 |
| 8,732,135 B1 * | 5/2014 | Gardner | 707/679 |
| 8,745,345 B2 * | 6/2014 | Reed et al. | 711/162 |
| 2006/0053216 A1 | 3/2006 | Deokar et al. | |
| 2006/0129615 A1 * | 6/2006 | Derk et al. | 707/204 |
| 2006/0271663 A1 * | 11/2006 | Barillari et al. | 709/223 |
| 2009/0013013 A1 * | 1/2009 | Derk et al. | 707/204 |
| 2009/0164527 A1 * | 6/2009 | Spektor et al. | 707/204 |
| 2009/0276592 A1 * | 11/2009 | Reed et al. | 711/162 |
| 2010/0005097 A1 * | 1/2010 | Liang et al. | 707/8 |
| 2010/0094948 A1 * | 4/2010 | Ganesh et al. | 709/212 |
| 2010/0274763 A1 * | 10/2010 | Ingen et al. | 707/645 |
| 2011/0055593 A1 * | 3/2011 | Lurey et al. | 713/193 |
| 2011/0099403 A1 * | 4/2011 | Miyata et al. | 713/323 |
| 2011/0125717 A1 * | 5/2011 | Manson | 707/679 |
| 2011/0231698 A1 * | 9/2011 | Zlati et al. | 714/3 |
| 2011/0270968 A1 * | 11/2011 | Salsburg et al. | 709/224 |
| 2012/0011338 A1 * | 1/2012 | Kobayashi | 711/162 |
| 2012/0041927 A1 * | 2/2012 | Derk et al. | 707/652 |
| 2012/0300940 A1 * | 11/2012 | Sabin et al. | 380/282 |
| 2013/0042083 A1 | 2/2013 | Mutalik et al. | |
| 2013/0046731 A1 | 2/2013 | Ghosh et al. | |
| 2013/0198738 A1 * | 8/2013 | Reddin et al. | 718/1 |
| 2014/0007121 A1 * | 1/2014 | Caufield et al. | 718/103 |

* cited by examiner

*Primary Examiner* — Saket K Daftuar
(74) *Attorney, Agent, or Firm* — Dergosits & Noah LLP; Todd A. Noah

(57) ABSTRACT

A method, system, article of manufacture, and apparatus for restoring workload backups in a clustered environment is discussed. In some embodiments, each node in the environment may be sequentially restored based on a request received from a remote client. Additionally or alternatively, the process may be controlled from an external server.

15 Claims, 9 Drawing Sheets

FEDERATED RESTORE OF CLUSTER SHARED VOLUMES

CROSS REFERENCE TO RELATED APPLICATIONS

This application is related to co-pending U.S. patent application Ser. No. 13/626,757 for FEDERATED BACKUP FOR CLUSTER SHARED VOLUMES and filed concurrently herewith, which is incorporated herein by reference for all purposes.

FIELD OF THE INVENTION

This invention relates generally to backup and recovery systems, and more particularly to systems and methods for performing a federated recovery in a clustered environment including a cluster shared volume.

BACKGROUND OF THE INVENTION

Traditional local computer applications and software are increasingly being replaced by remotely hosted solutions. Hosted solutions may provide scalability and flexibility at reduced cost. Remote solutions, however, present unique usability challenges. Users may demand that the hosted applications have an extremely high availability and low failure rate. Additionally, in the event of a system failure, users may demand expedient recovery of their data. System down-time as minor as several minutes may be unacceptable to a user, and may cost a service provider valuable business.

To address usability challenges, a service provider may implement a clustered failover environment. Servers in the cluster may maintain redundant copies of a given application, allowing the application to be activated on any node in the cluster should another node fail. Cluster environments, however, present novel backup and recovery challenges. Redundant copies of applications may be inconsistent between cluster nodes. Changes to an application on one node may not immediately be replicated on the other nodes. Further, changes made to an application may not immediately be written to a shared storage medium. As a result, backups of applications taken from individual nodes or common storage may be inconsistent and out-dated.

There is a need, therefore, for an improved method, system, article of manufacture, and apparatus for creating and restoring application backups in a clustered environment.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
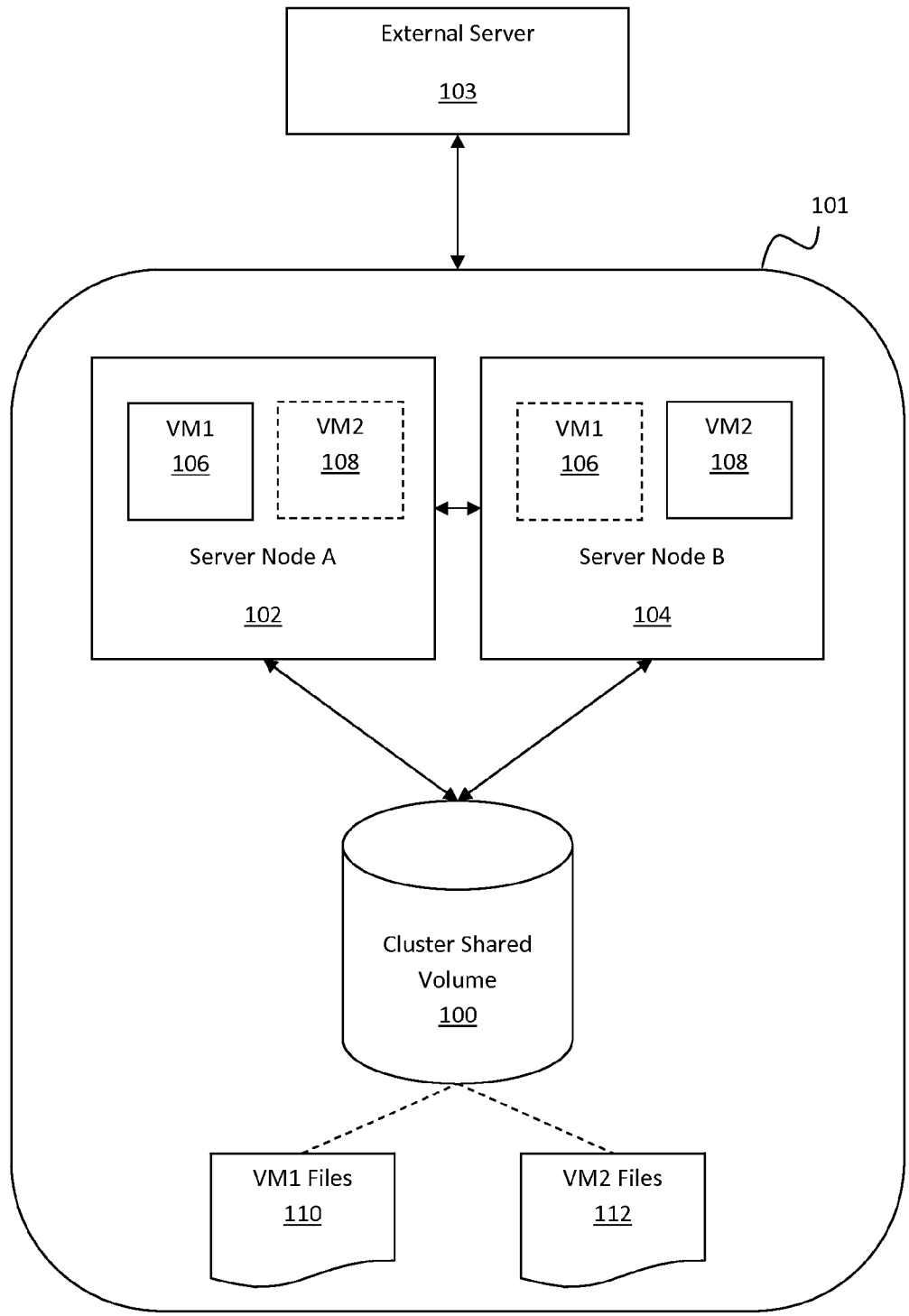
FIG. 1 illustrates a system architecture consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure provides a method and system for performing a federated backup of nodes in a clustered environment. In an embodiment, a single workload may reside on multiple nodes in a cluster and store data files on a cluster shared volume ("CSV"). This workload may, however, only actively run on a single node at a time. In order to control the backup process for these workloads and their data files, a master node may be designated. This master node may designate one or more slave nodes as coordinating nodes, and instruct them to sequentially backup each node's active workloads. The backups could be, for example, snapshots of the CSV. Once each slave node has performed a backup of its active workloads, the master node may be designated the coordinating node and its workloads may similarly be backed-up. In an embodiment, the backups are volume shadow copy snapshots of the workload data residing on the server node and/or the cluster shared volume. Additionally or alternatively, a federated restore operation may be performed from a central interface.

The present disclosure further provides a method and system for performing a federated restore of nodes in a clustered environment. Restoring a workload in a cluster may require the workload to be restored on the node where it is currently active. Workloads may, however, migrate during the time between backup and restore. In an embodiment, active workloads may be located before they are restored from a backup. Additionally or alternatively, an external client may specify which workloads are to be restored and where they are to be restored. In an embodiment, this client is not a node in the cluster. The client may further be in communication with an external server, such as an EMC NetWorker server, which coordinates the backups. In some embodiments, the workloads may be restored from volume shadow copies taken during the backup process.

FIG. 1 depicts a clustered architecture consistent with an embodiment of the present disclosure. Server node A 102 and server node B 104 may be two servers in a clustered environment 101. In some embodiments, cluster 101 may be a Hyper-V cluster, Microsoft Exchange DAG, or SQL 2012 Availability Group AlwaysOn. Server nodes 102 and 104 may be in communication with each other, such as over a network connection, and share access to CSV 100. In an embodiment, server nodes 102 and 104 may be Windows Server 2008 R2 server cores. CSV 100 may comprise a computer readable medium, such as a hard drive, solid state drive, optical medium, or memory. In an embodiment, the architecture may comprise more than two servers and a plurality of CSV's, and each server may have access to every CSV in the environment. External server 103 may be in communication with cluster 101, and in some embodiments may direct the backup process. External server 103 could be, for example, a EMC NetWorker server.

Workloads, such as virtual machines VM1 106 and VM2 108, may reside on both server node A 102 and server node B 104, and may store their data files on CSV 100. For example, CSV 100 may contain VM1 Files 110 for VM1 106, and may also contain VM2 Files 112 for VM2 108. In an embodiment, a single workload may reside on the cluster nodes. Additionally or alternatively, more than two workloads may reside on the cluster nodes.

In an embodiment, a workload may only be active on a single node in the cluster, however any node may be capable of hosting the workload. For example, in FIG. 1 virtual machine 106 is active on server node 102, and virtual machine 108 is active on server node 104. This may be beneficial in a failover environment. If server node 102 fails and is no longer accessible, virtual machine 106 may be migrated to server node 104. Similarly, if server node 104 fails virtual machine 108 may be migrated server 102. This may prevent a given virtual machine from becoming completely unavailable or inaccessible. In an embodiment, virtual machine files and/or data may be stored on CSV 100. When a node fails, the node may attempt to update these files or data for each of the node's active virtual machines. This updated data may then be accessed from a redundant node where the migrated virtual machines may be activated.

Figure 2:
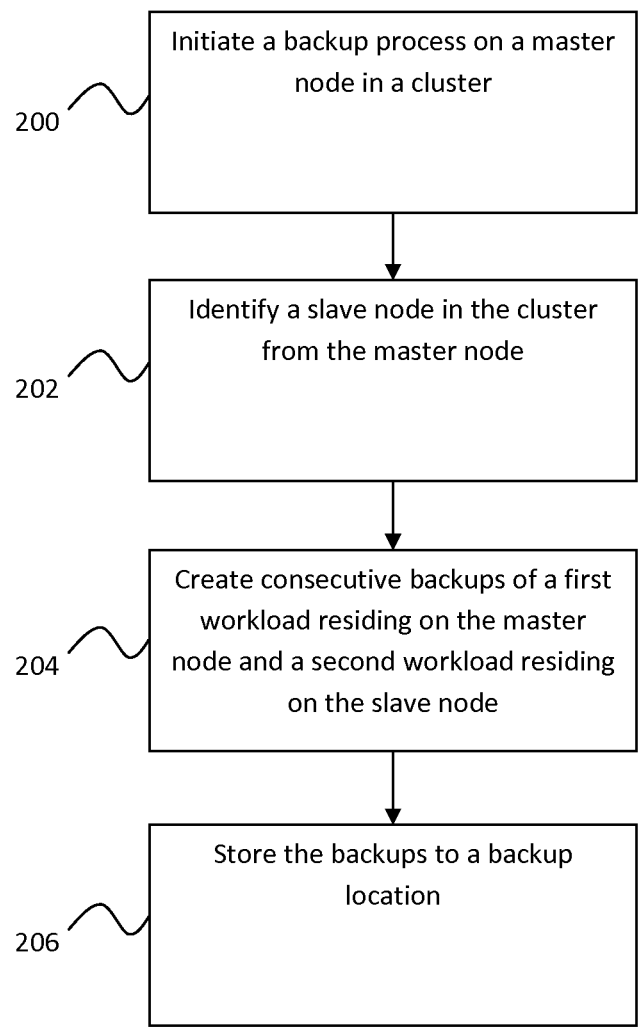
FIG. 2 is a flowchart of a method of conducting a federated backup consistent with an embodiment of the present disclosure.

FIG. 2 illustrates a method for backing up workloads in a clustered environment, such as the environment depicted in FIG. 1. At 200, a backup process is initiated on a master node. The master node may be any server node in the cluster environment, and may be randomly selected, specified by a user or administrator, or chosen based on a policy. In an embodiment, the process is initiated by a server external to the cluster, such as external server 103, which may be EMC NetWorker server. Additionally or alternatively, the external server may operate as the master node throughout the backup process, even though it is not part of the cluster. For example, an external server may serve as a proxy for one of the cluster nodes. This may permit the external server to access a CSV and operate as if the external server were a node in the cluster. In some embodiments, there is nothing unique about the master node other than it is the last node to backup its workloads.

At 202, the master node may identify a slave node in the cluster. This slave node may be any node in the cluster, and in an embodiment is every node that is not the master node. For example, in FIG. 1 server node 102 may be the master node and server node 104 may be a slave node. Conversely, server node 104 may be the master node and server node 102 may be a slave node.

At 204, backups of workloads on the nodes are created. These workloads could be, for example, virtual machines such as virtual machines 106 and 108. Additionally or alternatively, they may be software applications such as application servers, web servers, databases, or any other redundant process distributed over a plurality of nodes. In an embodiment, each node only performs a backup on virtual machines active on that node. For example, in FIG. 1 server 102 may backup VM1 106, and server 104 may backup VM2 108.

In some embodiments, the backups may comprise snapshots of a CSV, such as CSV 100. This snapshot may be taken by any node in the cluster. Taking a data snapshot of a CSV may return a backup of every data file for all the workloads operating in the cluster, however data files for workloads operating on nodes other than the node taking the snapshot may be stale. For example, the node where a workload is actively operating may have pending I/O operations that have not been communicated to the CSV. A snapshot of the CSV may therefore miss these changes. The node taking the snapshot, however, may force its workloads to update their data files before the backup is taken. Once the snapshot is taken, the next node in the cluster may perform the same operations and take a second snapshot. Each node's snapshot may therefore accurately capture the most recent embodiment of the workload files.

For example, if server node A 102 takes a backup snapshot of CSV 100, the snapshot may include both VM1 files 110 and VM2 files 112, even though VM2 108 is not active on server node A 102. VM2 files 112, however, may be inconsistent with the present active embodiment of VM2 108 operating on server node B 104. For example, there may be pending write operations from VM2 108 which have not yet been made to CSV 100. A snap shot from server node A 102 may therefore miss those changes. Server node A 102, in contrast, may force VM1 106, and/or any other workload actively operating on the node, to perform all I/O operations prior to taking the snapshot. The snapshot may therefore accurately capture the most recent embodiment of the VM1 data files 110.

In some embodiments, after CSV snapshots have been taken the workload data files may be extracted. The final backups may comprise these data files. This may reduce backup storage requirements by limiting the amount of retained data, and may also reduce recovery time. Additionally or alternatively, the backups may comprise the snapshots themselves, and the individual workload data files may only be extracted at restore time. This may conserve system compute resources, which may be beneficial if the backup operations are frequent and restore operations are less so. For example, if backups are taken daily but restores only occur once a year, it may be desirable to extract the data files once annually (one time per year) rather than once daily (365 times per year).

In an embodiment, the backups created at 204 are consecutive. Consecutive backups may be taken on a per node basis. For example, all of the workloads on a specific node may be backed up first, followed by a next node, until all the workloads in the cluster environment have been backed up.

In an embodiment, the master node controls the order in which node backups are taken. Additionally or alternatively, an external application, such as EMC NetWorker, or any other node in the environment may prioritize the backups. Priority may be based, for example, on the number of nodes in the environment. All the slave nodes may be backed up first, and the master node may be backed up last. Conversely, the master node may be backed up first and the slave nodes last. In some embodiments, there is not workload residing on the master node and therefore the master node is never backed up. In an embodiment, backup priority is based on the number of workloads active on a given node. For example, a node with more active workloads may be determined more important than a node with less workloads, and may therefore be backed up first. Additionally or alternatively, priority may be based on available node resources. In an embodiment, priority may be based on node failure rate. A node which has a higher failure rate may receive a higher priority because there may be a greater risk of data loss. Priority may also be based on individual workloads. For example, a given virtual machine may comprise a critical application, and whichever node that virtual machine is actively operating on may receive the highest priority level. In an embodiment, the backup order is not based on a priority, and may be randomized or arbitrary.

At block 206 the workload backups are stored to a backup location. This may be a backup server or database. In an embodiment, the backups may be stored in the cloud. Additionally or alternatively, the backup may be placed on a remote host and/or a media server.

Figure 3:
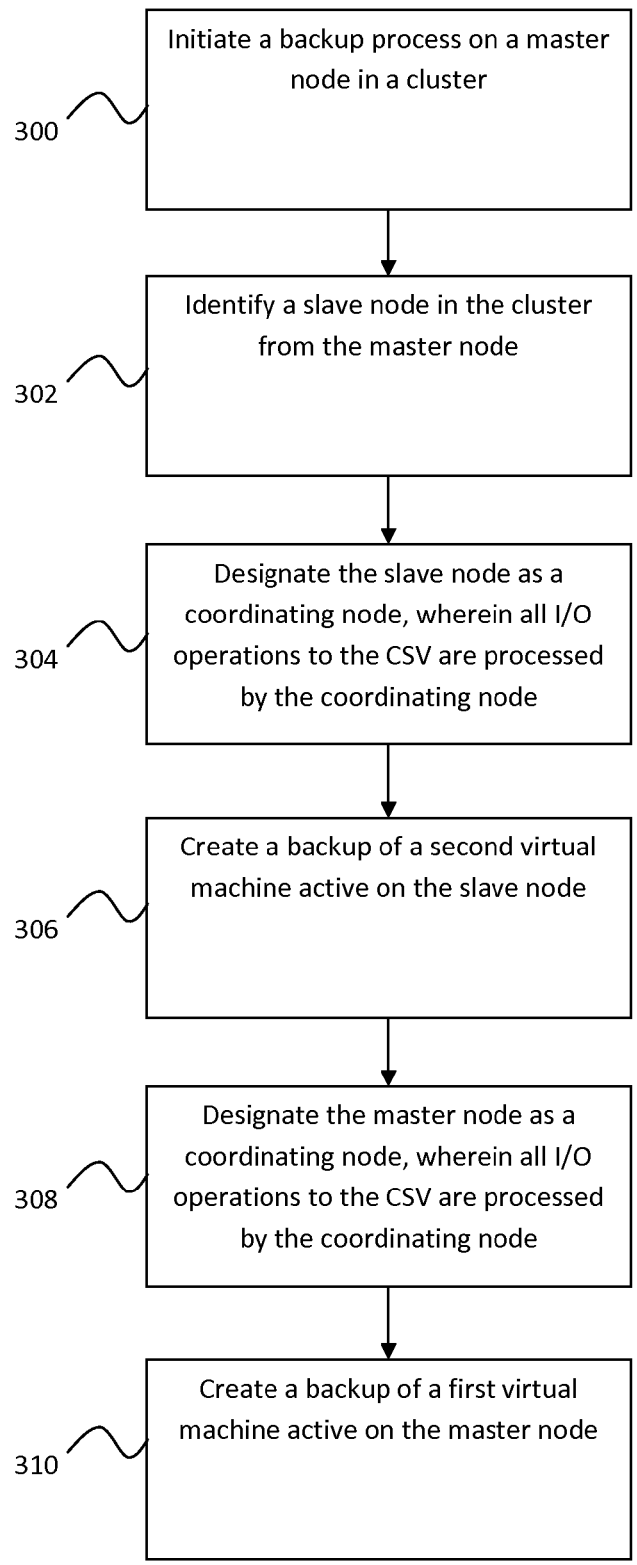
FIG. 3 is a flowchart of a method for conducting a federated backup from coordinating nodes consistent with an embodiment of the present disclosure.

Turning now to FIG. 3, an additional or alternative method for backing up workloads in a clustered environment is shown. At 300, a backup process is initiated on a master node in a cluster. In an embodiment, this process may be substantially similar to block 200 discussed above. At 302 a slave node is identified by the master node. This slave node may be, for example, substantially similar to the slave nodes discussed in reference to block 202.

At 304, the slave node is designated as a coordinating node. The coordinating node may be used to processes input/output ("I/O") operations to a CSV, such as CSV 100. In an embodiment, the coordinating node may handle all I/O operations to the CSV. For example, the coordinating node may be responsible for synchronizing access to the CSV from every the node in the cluster.

At 306, a backup of a workload residing on the slave node is made. This backup could occur, for example, while the slave node is the coordinating node. In an embodiment, this backup is substantially similar to the backup taken in block 204. In some embodiments, this backup may comprise a data snapshot of the CSV, which may be taken while the slave node is a coordinating node. Further, since the coordinating node may control all I/O operations, the node may force its active workloads to update their data files on the CSV. This may ensure that the snapshot comprises the most recent embodiment of the coordinating node's active workloads.

For example, operations on workloads active on nodes other than the coordinating node may not be immediately written to the CSV, and therefore risk not being captured by a backup process. Designating the slave node as a coordinating node may help alleviate this risk. The node may have access to both the active workload and the workload files stored on the CSV, and a backup may embody one or both of these locations. Additionally or alternatively, workload files residing on the CSV may not be updated, modified, or deleted without being processed by the coordinating node. As a result, backups of the active workloads and corresponding data residing on the CSV will be as current as possible when they are taken from a coordinating node controlling all I/O operations.

At 308, the master node is designated as the coordinating node. In an embodiment, the master node may process all I/O operations to/from the CSV. This process may be, for example, substantially similar to the process discussed in reference to block 304.

In an embodiment, there may only be one coordinating node in the environment. Additionally or alternatively, there may be a plurality of slave nodes in a given environment. In such an embodiment, the slave nodes may be designated coordinating nodes prior to the master node, after the master node, or not at all. This may allow backups to be made of every workload active on the nodes in the cluster. In some embodiments, the master node may be the first coordinating node and backups of the slave nodes may follow. Additionally or alternatively, the coordinating node may be arbitrary such that the master node may be the coordinating node before the slave nodes, after the slave nodes, or anywhere in between the slave nodes.

At block 310, the backup of the workload operating on the master node may be made. This backup may be taken while the master node is the coordinating node, and therefore may capture the most recent state of any workloads active on the master node in addition to their corresponding data files in the CSV. In an embodiment, the backup may comprise a data snapshot of the CSV. Additionally or alternatively, this backup may be stored to a backup location, such as a remote host or cloud storage.

Figure 4:
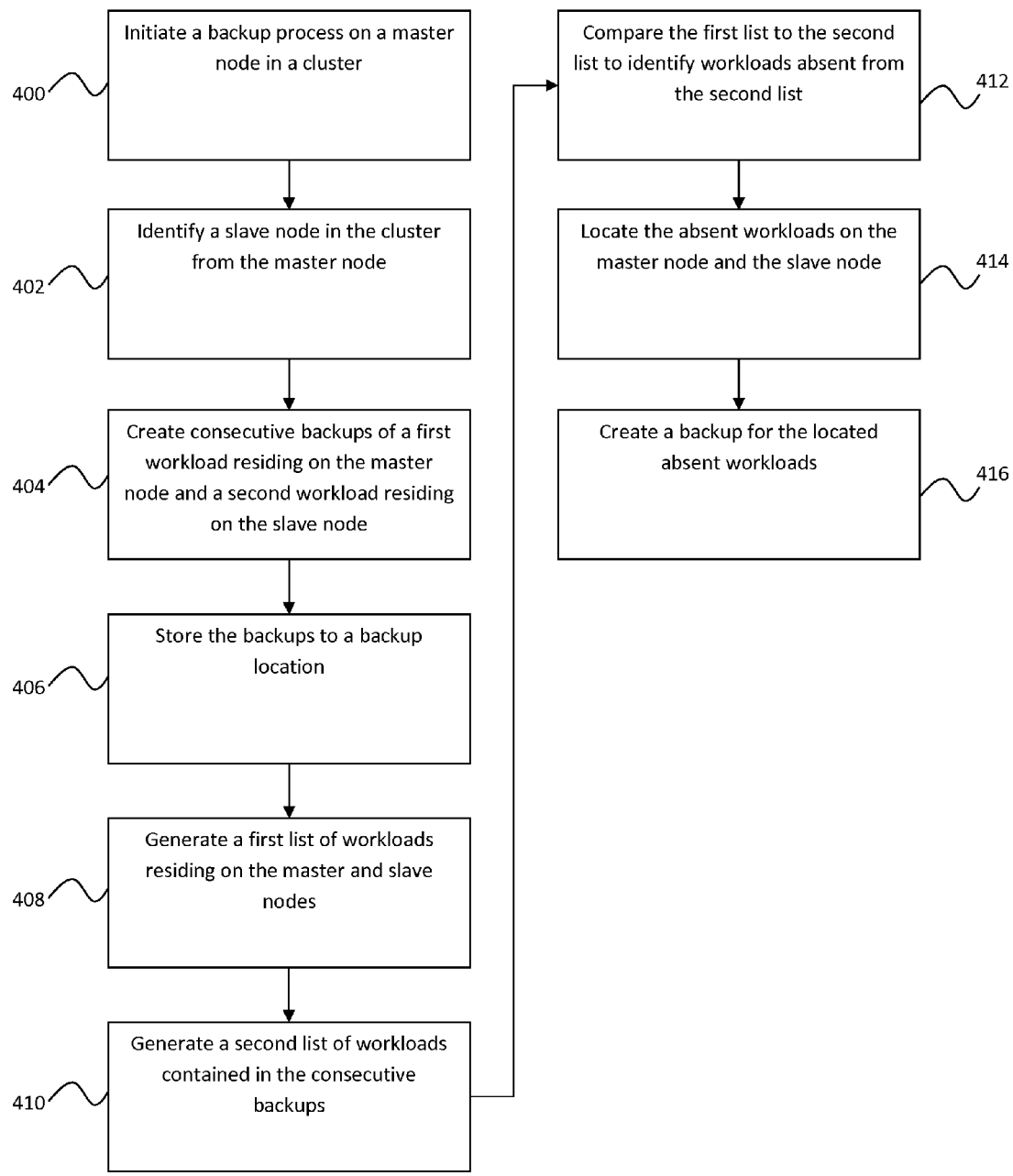
FIG. 4 is a flowchart of a method for determining whether workloads were missed during the federated backup and is consistent with an embodiment of the present disclosure.

Turning now to FIG. 4, a flow chart of a method for verifying workload backups is discussed. At 400, a backup process is initiated on a master node in a cluster, and at 402 one or more slave nodes are identified from the master node. At 404, consecutive backups of the workloads operating on master node and the slave nodes are created, and at 406 they are stored to a backup location. In an embodiment, blocks 400-06 are substantially similar to blocks 200-06 depicted in FIG. 2.

At 408, a first list comprising workloads residing in the cluster is retrieved. This list may be statically maintained in storage, or may be dynamically generated during the backup process. In some embodiments, this list may be generated using cluster aware technology, such as EMC NetWorker. In an embodiment, the list is retrieved by the master node. Additionally or alternatively, the list may be retrieved by an external server that is independent of the clustered environment, such as external server 103, or may be retrieved by a slave node. In some embodiments, it may not be desirable to perform a backup of every workload in the environment and the list may only contain workloads expected to be backed up. For example, backups may be performed incrementally and the list may only contain workloads to be backed up in the present increment. Such an embodiment may be help conserve system resources.

At 410, a list of workloads captured by the consecutive backups is generated. This list may be compiled during the backup process on each coordinating node. Once a node has successfully backed up its workload, the list may be passed to the next coordinating node in the cluster. Additionally or alternatively, each node may communicate its successful backups to the master node or external server where they are added to the list. Additionally or alternatively, the list of successful backups may be written to a CSV, where it may be modified or retrieved by any node in the cluster.

At 412, the first list of workloads is compared to the second list of workloads, and any discrepancies are identified. This may be used to locate workloads that were missed by the backup process. This could occur, for example, if a workload is migrated during the backup process from a node which has not been backed up to a node which has already been backed up. Additionally or alternatively, it may occur if a node in the cluster fails during the backup process, and its workloads are restored to nodes which have already backed up their workloads. In an embodiment, the comparison may occur on the master node, a slave node, or an external server.

At 414, the missing workloads identified at block 412 are located. In an embodiment, a query is sent to the nodes in the cluster and the node on which the workload is actively operating responds. Additionally or alternatively, a registry maintaining workload locations may be queried. In some embodiments, the missing workloads may not be located, and the backup process may re-initiate at block 400.

At 416, the backups may be created for the missing workloads. This could occur, for example, by designating the node operating the workload as a coordinating node. If multiple workloads were missed during the backup process, they may be prioritized in a manner substantially similar to that discussed above.

Figure 5:
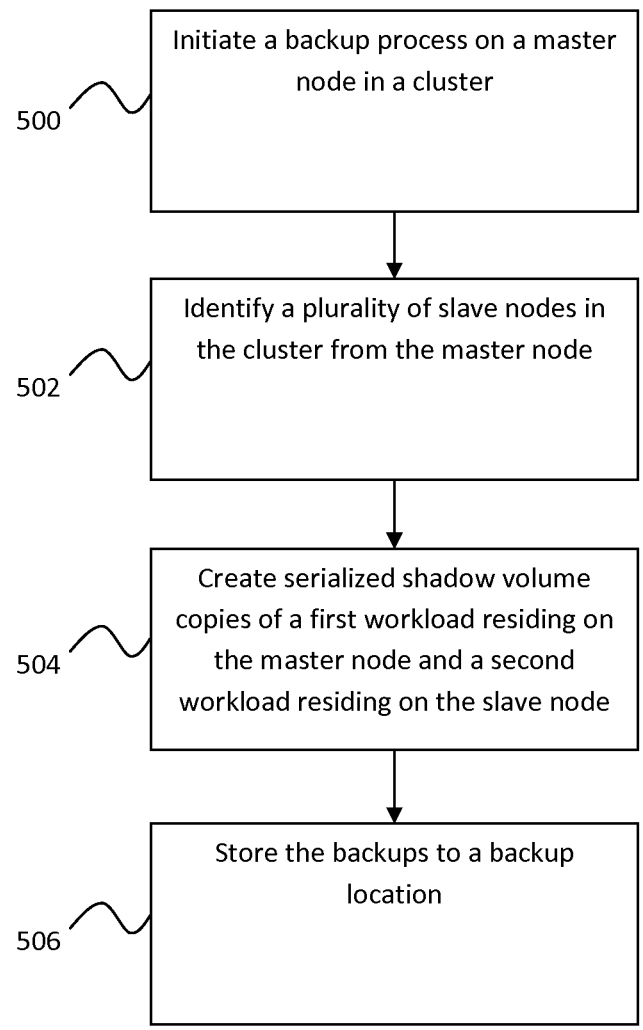
FIG. 5 is a flowchart of a method of conducting a federated backup for a plurality of nodes using serialized shadow volume copies.

With reference to FIG. 5, a method for serializing workload backups and taking volume shadow copies is discussed. In an embodiment, the method of FIG. 5 is substantially similar to the method depicted in FIG. 2. At 500, a backup process is imitated on a master node in a cluster. This process may be initiated by an external server that is not part of the cluster environment. In some embodiments, the master node may be an external server that coordinates the backup process but is not part of the cluster. At 502, a plurality of slave nodes is identified from the master node. In an embodiment, the slave nodes may be every node in the cluster that is not the master node.

At 504, serialized backups of the workloads are created. Serializing the backups may allow them to be created from, and restored to, a plurality of locations. This may be helpful in a clustered, failover environment where workloads may be migrated between nodes on a periodic basis. In some embodiments, serializing the backups also allows them to be taken from a first node and restored to a second node. As a result, the workloads may be restored to any node in the environment, rather than only the node which originally performed the backup.

In an embodiment, the backups taken at 504 are volume shadow copies of the workloads. Volume shadow copies may comprise snapshots of a volume, such as a CSV. In an embodiment, the volume shadow copies may be taken by a coordinating node while backing up that node's workloads. The coordinating node may force the workload to update any workload data files residing on the CSV prior to taking the snapshot. As a result, the snapshot may embodiment the most up-to-date copies of the workload data files.

At 506, workload files may be extracted from the volume shadow copy and stored to a backup location. Additionally or alternatively, the entire snap shot may be stored to a backup location and the files may be extracted when, if ever, the workloads are migrated or restored.

Figure 6:
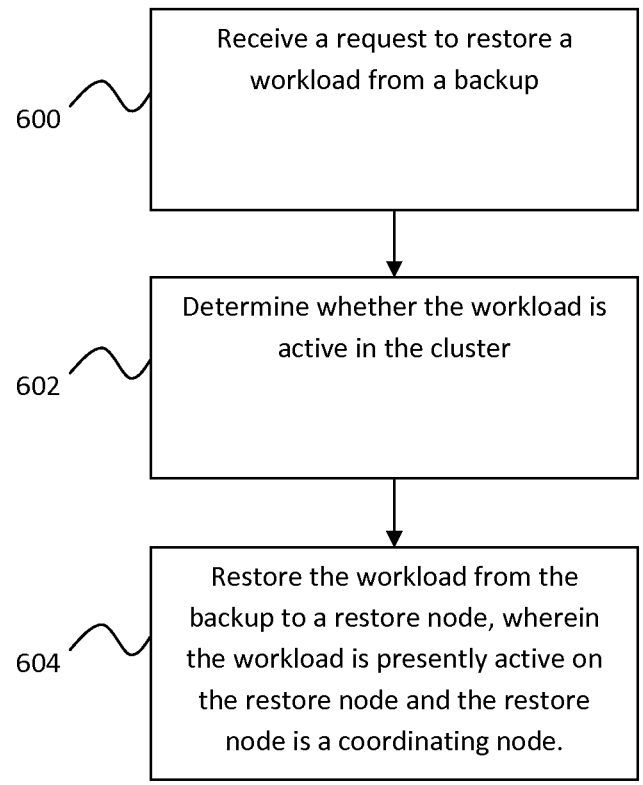
FIG. 6 is a flowchart of a method for restoring a workload to a node, and is consistent with an embodiment of the present disclosure.

Turning now to FIG. 6, a method for restoring workloads to nodes in a cluster is discussed. In some embodiments, these workloads may be virtual machines. At 600, a request to restore a workload from a backup is received. In an embodiment, the backups may be substantially similar to those discussed above. Additionally or alternatively, the request may be to restore from any other form of backup. If workload backups were stored as CSV snapshots, the individual data files may be extracted. Additionally or alternatively, the backups may comprise already extracted workload files.

At 602, a check is performed to determine if the workload is active in the cluster. In an embodiment, this check is performed by an external server, such as external server 103. Additionally or alternatively, the check may be performed by a node in the cluster. For example, a node in the cluster may comprise cluster aware technologies or a registry of workloads in the cluster. This node may be used to determine whether the requested workload is presently active in the environment. If the workload is active, its location may be returned. The location may then be used to restore the workload at block 604.

In some embodiments, the workload may not be active in the environment. For example, a node may fail and its workloads may not be properly migrated, or the workload may become corrupt. In such embodiments, the restore request may be made because the workload is not active. If a workload is not active, no location may be returned. Additionally or alternatively, a default, random, or arbitrary node location may be returned. For example, the system may always restore inactive workloads to a specified node. This node could be specified based on available resources or high availability.

Determining whether the workload is currently active and its location may be helpful in an environment where workloads are frequently migrated. For example, when a workload backup is taken the workload may be active on a first server node. After the backup, however, the workload may migrate one or more times. As a result, the workload may no longer be active on the first server node at restore time. Restoring the workload to the first node may create conflicts because the system may not permit workloads to be active on multiple nodes.

At block 604, the workload may be restored from a backup to a restore node. The restore node may be any node in the environment, and in some embodiments is the node on which the workload is presently active. For example, the restore node may be the node returned by the check performed at block 602. Restoring a workload to a node on which it is currently active may prevent conflicts since a workload may be restricted to only operating on one node in the system.

In an embodiment, the restore node is made the coordinating node. The coordinating node in a restore process may be substantially similar to a coordinating node in the backup process. For example, the coordinating node may process all I/O operations to a CSV. When a restore is performed on a coordinating node, the workload data files may be written to the CSV. This may ensure that both the restored workload and its files are consistent between the CSV and the restore node, and are also consistent with the rest of the cluster environment.

Figure 7:
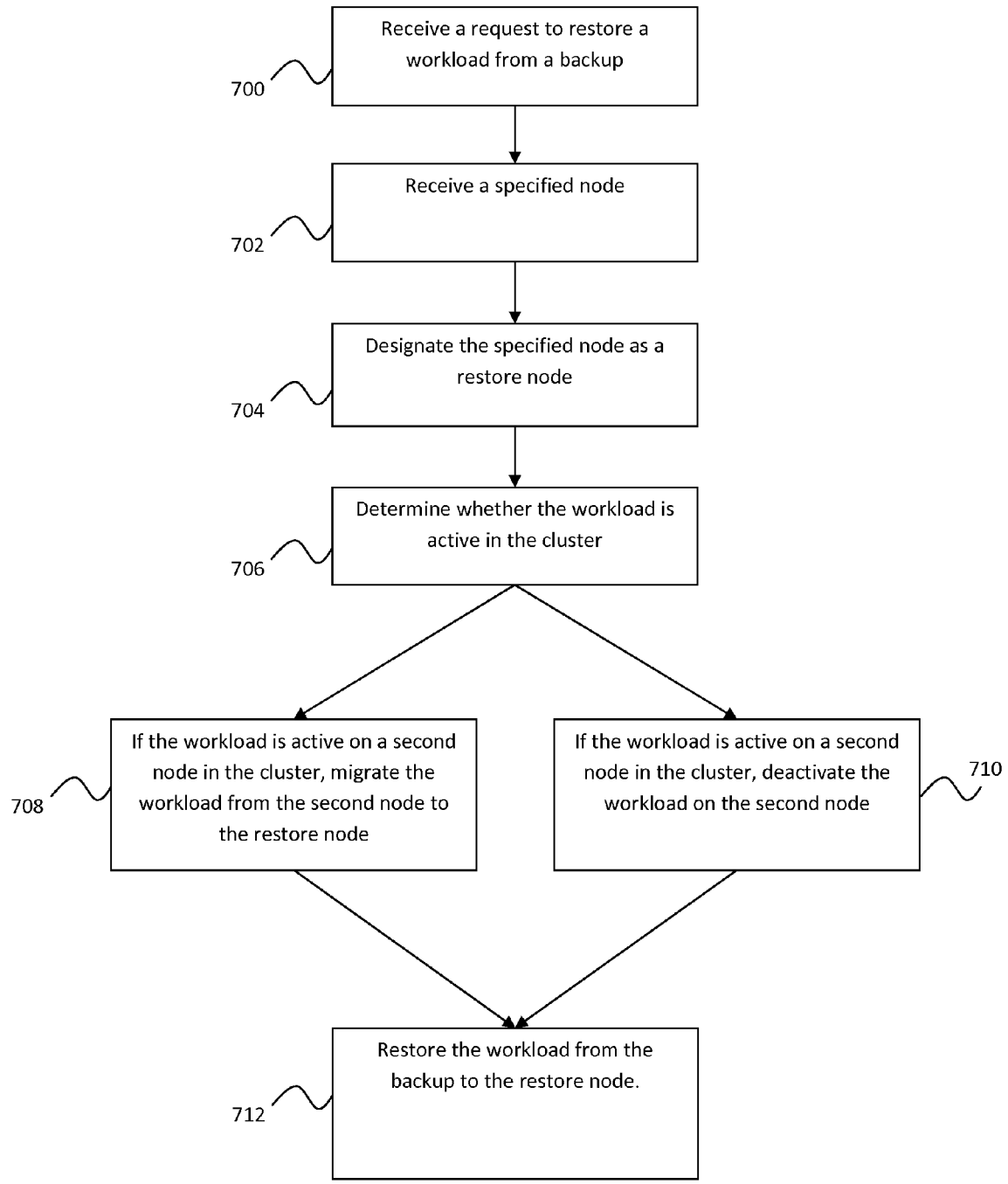
FIG. 7 is a flowchart of a method for restoring a workload to a specified node, and is consistent with an embodiment of the present disclosure.

Turning now to FIG. 7, a method for restoring a workload to a specified location is discussed. At 700, a request is received to restore a workload from a backup. This request could, for example, be received from a user. In an embodiment the request is received by a cluster node or by an external server.

At 702, a specified node is received. This specified node may be the node where the workload is to be restored, and may be provided by a user or a policy. For example, the node may be selected based on its available resources. A policy or user may determine that it is desirable to restore a workload to a node with more resources than a node with less resources. Additionally or alternatively, the node may be selected based on failure rate or how many workloads it is currently processing. Any other criteria may similarly be used to specify a given node. In an embodiment, the specified node is received concurrently with the restore request. The specified node and the request may be, for example, communicated in the same message.

At 704, the specified node is designated as a restore node. The restore node may be any node in the cluster, and in an embodiment is the node on which the workload will be restored. In an embodiment, the restore node is substantially similar to the restore node discussed in reference to block 604.

At 706, a check is made to determine whether the workload is active in the cluster. If the workload is active on a node that is not the restore node, the workload location may be returned, and at 708 the workload may be migrated to the restore node. Additionally or alternatively, the workload may be deactivated on the other node at 710, and activated on the restore node after it is restored. Migrating or deactivating the node may prevent the workload from being active on multiple nodes in the environment. For example, restoring the node without migration or deactivation may result in the workload being active on both the restore node and a second node.

At 712, the workload is restored to the restore node. This restore operation may be substantially similar to the restore discussed at 604, and in an embodiment the restore node is a coordinating node.

Figure 8:
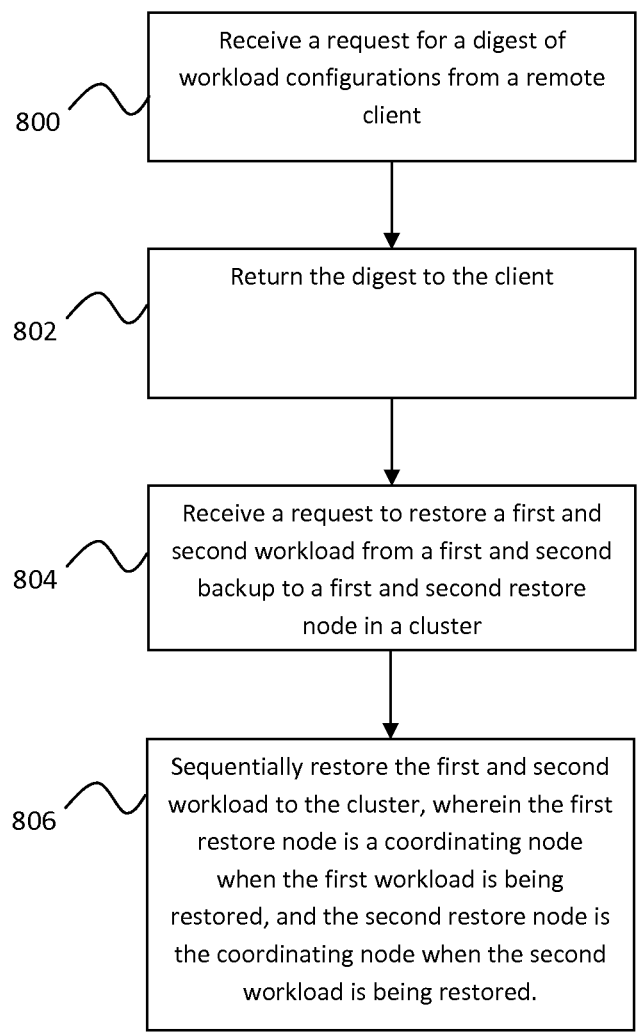
FIG. 8 is a flowchart of a method for restoring a plurality of workloads to nodes in a cluster, and is consistent with an embodiment of the present disclosure

With reference to FIG. 8, a method for restoring a plurality of workloads to nodes in a cluster is discussed. At 800, a request is received from a remote or local client for a digest of workload configurations. The remote client may be a remote machine or server, and the request may be submitted by a user. The request may be received by a node in the cluster which may be cluster aware. For example, the request may be received by an aliasing node which is aware of the other nodes in the cluster. Additionally or alternatively, the node may know the location and/or status of workloads operating in the cluster.

In an embodiment, the cluster is a Hyper-V Failover cluster and the client is a Hyper-V Plugin. Additionally or alternatively, the request may be received by a Hyper-V Agent operating on a node in the cluster.

At 802, a digest of workload configurations may be returned to the remote client. This digest may include the locations and state of all the workloads in the cluster. Additionally or alternatively, the digest may only include the location and status of some workloads in the cluster. For example, the request received at 800 may include a set of criteria and only workloads meeting that criteria may be returned. Criteria could include, for example, time of last workload restore, time of last workload backup, workload fail rate, or any other policy or user defined attribute.

At 804, a request to restore a plurality of workloads is received. Additionally or alternatively, the request could be to restore a single workload. In an embodiment, the request is received by an external server, such as an EMC NetWorker server. Additionally or alternatively, the request may be received by a node in the cluster. The request may include the names, locations and/or status of the workloads to be restored, and may be a request to restore every workload in the cluster. In an embodiment, the request may requires the workloads to be restored to separate locations, such as a first workload to a first node and a second workload to a second node. Further, the workloads may not be the same and therefore may be restored from separate backups, such as a first backup and a second backup. In some embodiments, the restore request may specify where the workloads are to be restored. This process may be substantially similar to that discussed in reference to FIG. 7. Additionally or alternatively, the workloads may be restored only to nodes where they are currently active. If the workloads are not presently active, they may be restored to a specified, random, or arbitrary node.

At 806, the workloads are sequentially restored to nodes in the cluster. In an embodiment, this process may be substantially similar to the consecutive backups discussed above. For example, a first workload may be restored to a first node in the cluster. This restore could be directed by an external server. In an embodiment, the first node is designated as a coordinating node during the restore process. Once the restore is complete, a completion message may be returned from the first node to the external server. The server may then initiate a restore process on a second node, which may be similar to the restore process on the first node. In an embodiment, there are more than two nodes in the cluster and the restore process continues sequentially until all the specified workloads have been restored.

Figure 9:
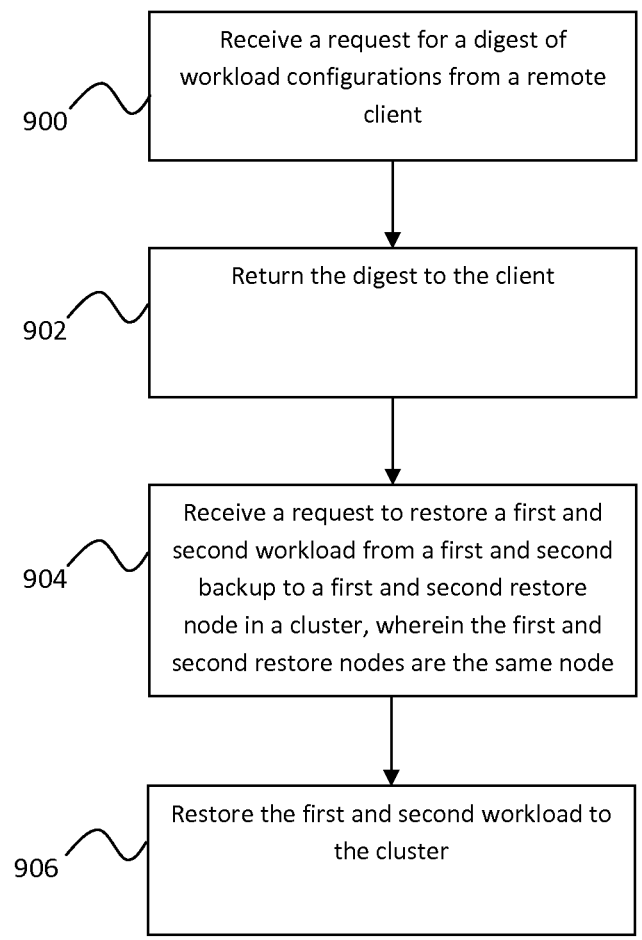
FIG. 9 is a flowchart of a method for restoring a plurality of workload to the same node in a cluster, and is consistent with an embodiment of the present disclosure.

Turning now to FIG. 9, a method for restoring a plurality of workloads to a single node is discussed. In an embodiment, this process is substantially similar to that depicted in FIG. 8.

At 900, a request for a digest or workload configurations is received, and at 902 the digest is returned. In an embodiment, this is substantially similar to steps 800-02. At 904, request to restore a plurality of workloads in the cluster is received, and at 906 the workloads are restored. For example, a first and second workload may be restored. In some embodiments, these workloads may be restored to the same node. For example, the first and second workload may be restored to a first and second node, where the first and second nodes are actually the same node. This may be beneficial, for example, if both workloads are presently active on the same node or if the workloads are related. For example, one workload may comprise a web server which interacts with a second workload that comprises an application server. These servers may be restored to the same node for performance or logical purposes.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for restoring workloads in a clustered server environment, comprising:
    receiving, by a server computer having one or more processors and a non-transitory computer readable medium computer readable program instructions embodied therein, a request to restore a workload from a backup data object, the backup data object being a backup of the workload stored on a cluster shared volume, to the clustered server environment, the cluster server environment comprising a plurality of nodes, each node being capable of hosting the workload;
    determining, by the server computer, if the requested workload is active in the clustered server environment, and, if the requested workload is active, identifying a node location of the requested workload;
    determining, by the server computer, a restore node from the plurality of nodes in the cluster server environment, wherein the restore node comprises a server;
    if the requested workload is active in the clustered server environment and the node location is different from the restore node, deactivating the requested workload at the node location;
    designating, by the server computer, the restore node as a coordinating node, wherein the coordinating node manages all of the input/output operations by the plurality of nodes to the cluster shared volume; and
    restoring, by the server computer, the requested workload from the backup data object to the restore node, and writing workload data files for the requested workload to the cluster shared volume in the cluster server environment.

2. The method of claim 1, wherein the workload is presently active on the restore node.

3. The method of claim 1, further comprising:
    receiving, by the server computer, a specified node; and
    designating, by the server computer, the specified node as the restore node.

4. The method of claim 3, further comprising deactivating, at the server, the workload on a second node that is not the specified node.

5. The method of claim 3, further comprising migrating, by the server, the workload from a second node to the specified node when the workload is active on the second node.

6. The method of claim 1, wherein the backup is serialized.

7. The method of claim 1, further comprising:
    receiving, by the server computer, a request for a digest of workload configurations from a remote client; and
    transmitting, by the server computer, the digest to the client.

8. The method of claim 1, further comprising:
    receiving, by the server computer, a request to restore a second workload from a second backup; and
    restoring, by the server computer, the second workload from the backup to a second restore node in the cluster server environment.

9. The method of claim 8, wherein restoring the workload and restoring the second workload are sequential.

10. The method of claim 8, wherein the restore node is a coordinating node when the workload is being restored, and the second restore node is the coordinating node when the second workload is restored.

11. The method of claim 8, wherein the restore node and the second restore node are the same node.

12. The method of claim 1, wherein the workload is a virtual machine.

13. The method of claim 1, wherein workload data files are stored in a cluster shared volume.

14. A computer program product comprising a non-transitory computer readable medium having computer readable program instructions embodied therein, the computer-readable program instruction adapted to be executed by one or more processors to implement a method for restoring workloads in a clustered server environment, the method comprising:
    receiving a request to restore a workload from a backup data object, the backup data object being a backup of the workload stored on a cluster shared volume, to the clustered server environment comprising a plurality of nodes, each node being capable of hosting the workload;
    determining, by the server computer, if the requested workload is active in the clustered server environment, and, if the requested workload is active, identifying a node location of the requested workload;
    determining a restore node from the plurality of nodes in the cluster server environment, wherein the restore node comprises a server;
    if the requested workload is active in the clustered server environment and the node location is different from the restore node, deactivating the requested workload at the node location;
    designating the restore node as a coordinating node, wherein the coordinating node manages all of the input/output operations by the plurality of nodes to the cluster shared volume; and
    restoring the requested workload from the backup data object to the restore node, and writing workload data files for the requested workload to the cluster shared volume in the cluster server environment.

15. A system, comprising:
    a server cluster comprising a first node and a second node;
    a non-transitory storage device comprising a cluster shared volume; and
    a processor configured to:
        receive a request to restore a workload from a backup data object, the backup data object being a backup of the workload stored on a cluster shared volume, to the clustered server environment comprising a plurality of nodes, each node being capable of hosting the workload;
        determine if the requested workload is active in the clustered server environment, and, if the requested workload is active, identify a node location of the requested workload;
        determine a restore node from the plurality of nodes in the cluster server environment, wherein the restore node comprises a server;

if the requested workload is active in the clustered server environment and the node location is different from the restore node, deactivate the requested workload at the node location;

designate the restore node as a coordinating node, wherein the coordinating node manages all of the input/output operations by the plurality of nodes to the cluster shared volume; and restore the requested workload from the backup data object to the restore node, and writing workload data files for the requested workload to the cluster shared volume in the cluster server environment.

\* \* \* \* \*